(12) United States Patent
Jain et al.

(10) Patent No.: US 10,901,831 B1
(45) Date of Patent: Jan. 26, 2021

(54) SYSTEM, METHOD, AND COMPUTER PROGRAM FOR ERROR HANDLING IN MULTI-LAYERED INTEGRATED SOFTWARE APPLICATIONS

(71) Applicant: Amdocs Development Limited, Limassol (CY)

(72) Inventors: Vikas Jain, Pune (IN); Prashant Puvvala, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 115 days.

(21) Appl. No.: 16/239,368

(22) Filed: Jan. 3, 2019

Related U.S. Application Data

(60) Provisional application No. 62/613,374, filed on Jan. 3, 2018.

(51) Int. Cl.
*G06F 11/07* (2006.01)

(52) U.S. Cl.
CPC ........ *G06F 11/079* (2013.01); *G06F 11/0706* (2013.01); *G06F 11/0751* (2013.01); *G06F 11/0778* (2013.01); *G06F 11/0793* (2013.01)

(58) Field of Classification Search
CPC ............... G06F 11/079; G06F 11/0706; G06F 11/0751; G06F 11/0778; G06F 11/0793; G06F 11/3664; G06F 11/3409; G06F 11/3692
See application file for complete search history.

(56) References Cited

U.S. PATENT DOCUMENTS

| | | | |
|---|---|---|---|
| 7,962,798 B2 | 6/2011 | Locasto et al. | |
| 8,924,782 B2 | 12/2014 | Locasto et al. | |
| 8,949,671 B2 * | 2/2015 | Mukherjee | G06F 11/0766 714/26 |
| 10,331,542 B2 * | 6/2019 | Iyer | G06F 11/3636 |
| 2006/0253740 A1 * | 11/2006 | Ritz | G06F 11/0769 714/38.13 |
| 2008/0307267 A1 * | 12/2008 | Chandrasekaran | G06F 11/3688 714/38.11 |
| 2017/0278007 A1 | 9/2017 | Anchuri et al. | |
| 2017/0371768 A1 * | 12/2017 | Iyer | G06F 11/3636 |

(Continued)

*Primary Examiner* — Nadeem Iqbal
(74) *Attorney, Agent, or Firm* — Zilka-Kotab, P.C.

(57) ABSTRACT

A system, method, and computer program product are provided for error handling in multi-layered integrated software applications. In operation, a system monitors a multi-layered integrated software application utilizing a process that runs in parallel with the multi-layered integrated software application and reads one or more logs generated by the multi-layered integrated software application. The system identifies one or more errors from the one or more logs. The system parses the one or more errors based on one or more decision files, wherein the one or more decision files include specific keywords that are defined as part of rule configuration utilized to identify a source of the one or more errors. Further, the system identifies the source of the one or more errors in the multi-layered integrated software application utilizing the one or more decision files. The system may then automatically fix the one or more errors based on the one or more decision files, and/or automatically generate one or more incident reports for the one or more errors based on the one or more decision files.

18 Claims, 9 Drawing Sheets

(56) References Cited

U.S. PATENT DOCUMENTS

| | | | |
|---|---|---|---|
| 2018/0107584 A1* | 4/2018 | Iyer | G06F 11/3636 |
| 2019/0146901 A1* | 5/2019 | Hoover | G06F 16/338 |
| | | | 714/38.1 |
| 2019/0340061 A1* | 11/2019 | Cmielowski | G06F 11/0772 |

* cited by examiner

300

SYSTEM, METHOD, AND COMPUTER PROGRAM FOR ERROR HANDLING IN MULTI-LAYERED INTEGRATED SOFTWARE APPLICATIONS

RELATED APPLICATIONS

The present application claims priority to U.S. Provisional Application No. 62/613,374, entitled "SYSTEM, METHOD, AND COMPUTER PROGRAM FOR ERROR HANDLING IN MULTI-LAYERED INTEGRATED SOFTWARE APPLICATIONS," filed on Jan. 3, 2018, the entire contents of which are incorporated herein by reference.

FIELD OF THE INVENTION

The present invention relates to automated software error detection and resolution in highly integrated software systems and, more particularly to, reducing cost of maintenance and improving turnaround time required for fixing exceptions in highly integrated software systems.

BACKGROUND

Software applications play an important role for a business and applications need maintenance and repairs to keep working, similar to any other asset in the company. If the company wants to improve the return on investment on applications or software, the company needs to make sure that applications are working properly, and will work as desired. Hence software application maintenance is important as it fine-tunes the performance ability, functionality, and usability of the software.

Software application maintenance is a continued cost once a software product is deployed into a production system. A majority of cost goes into the fixing of regular errors or exceptions happening within application due to various reasons.

In an enterprise software product scenario, unhandled errors or exceptions are a major portion of impacts on production operations. The probability of integration related errors increases in highly integrated software applications. The multilayer integration also adds to overall turnaround time to resolve these errors, thus impacting business and increasing overall cost of maintenance. The majority of effort spent to analyze integrated software application errors is taken by intermediate layers to identify an actual source of errors. Intervention of manual experts that is required for such analysis increases the time taken to identify the source of problem.

There is thus a need for addressing these and/or other issues associated with the prior art.

SUMMARY

A system, method, and computer program product are provided for error handling in multi-layered integrated software applications. In operation, a system monitors a multi-layered integrated software application utilizing a process that runs in parallel with the multi-layered integrated software application and reads one or more logs generated by the multi-layered integrated software application. The system identifies one or more errors from the one or more logs. The system parses the one or more errors based on one or more decision files. The one or more decision files include specific keywords that are defined as part of rule configuration utilized to identify a source of the one or more errors. Further, the system identifies the source of the one or more errors in the multi-layered integrated software application utilizing the one or more decision files. The system may then automatically fix the one or more errors based on the one or more decision files, and/or automatically generate one or more incident reports for the one or more errors based on the one or more decision files.

DETAILED DESCRIPTION

Figure 1:
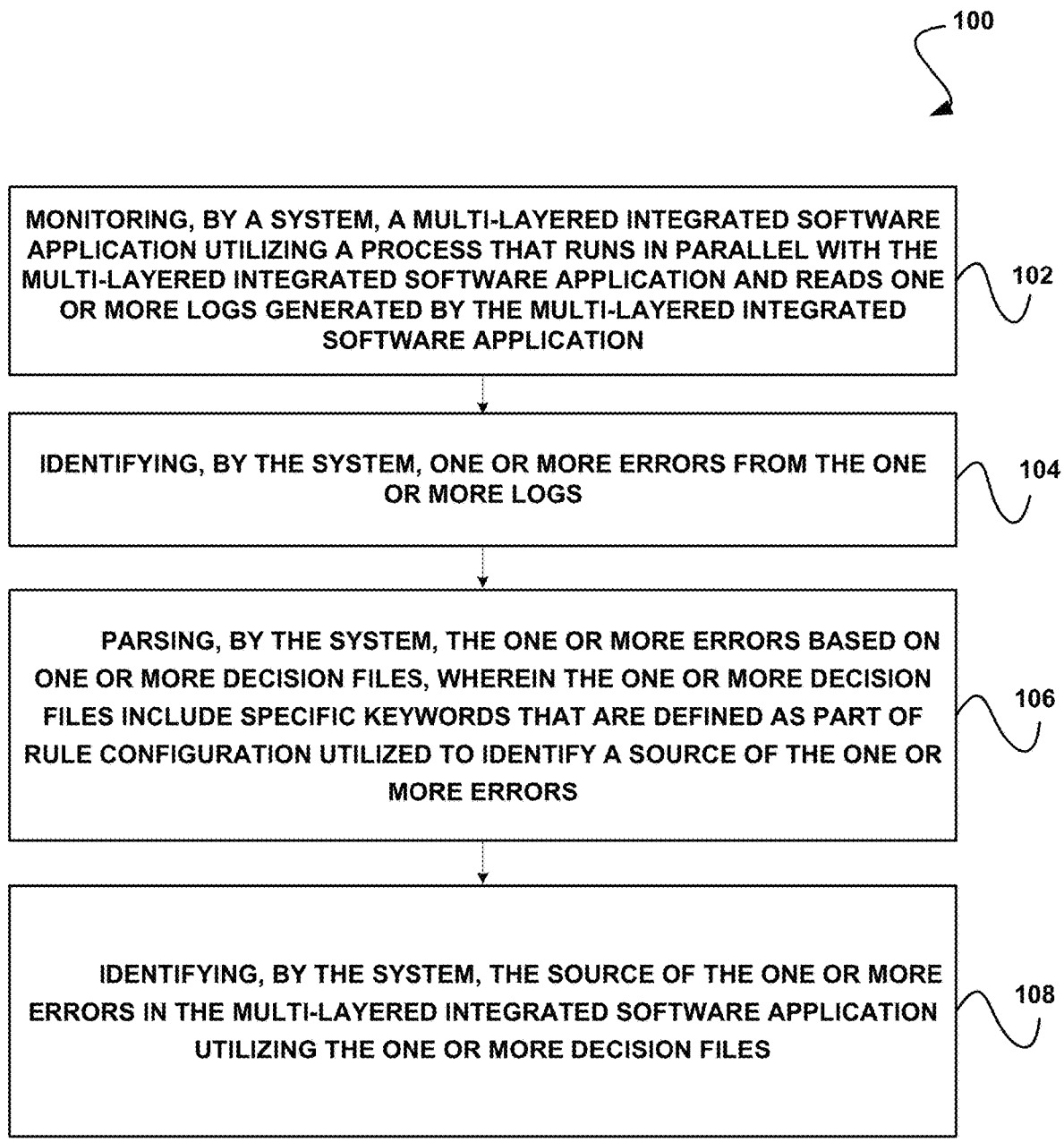
FIG. 1 illustrates a method for error handling in multi-layered integrated software applications, in accordance with one embodiment.

FIG. 1 illustrates a method 100 for error handling in multi-layered integrated software applications, in accordance with one embodiment.

In operation, a system monitors a multi-layered integrated software application utilizing a process that runs in parallel with the multi-layered integrated software application and reads one or more logs generated by the multi-layered integrated software application. See operation 102.

The system identifies one or more errors from the one or more logs. See operation 104.

The system parses the one or more errors based on one or more decision files. The one or more decision files include specific keywords that are defined as part of rule configuration utilized to identify a source of the one or more errors. See operation 106.

Further, the system identifies the source of the one or more errors in the multi-layered integrated software application utilizing the one or more decision files. See operation 108. The system may then automatically fix the one or more errors based on the one or more decision files, and/or automatically generate one or more incident reports for the one or more errors based on the one or more decision files.

Thus, the system may function to automatically determine and resolve errors/exceptions occurring in a multi-layered integrated software application, using an automated process that identifies the actual source of problem (i.e. identifying a respective layer where the error has occurred).

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
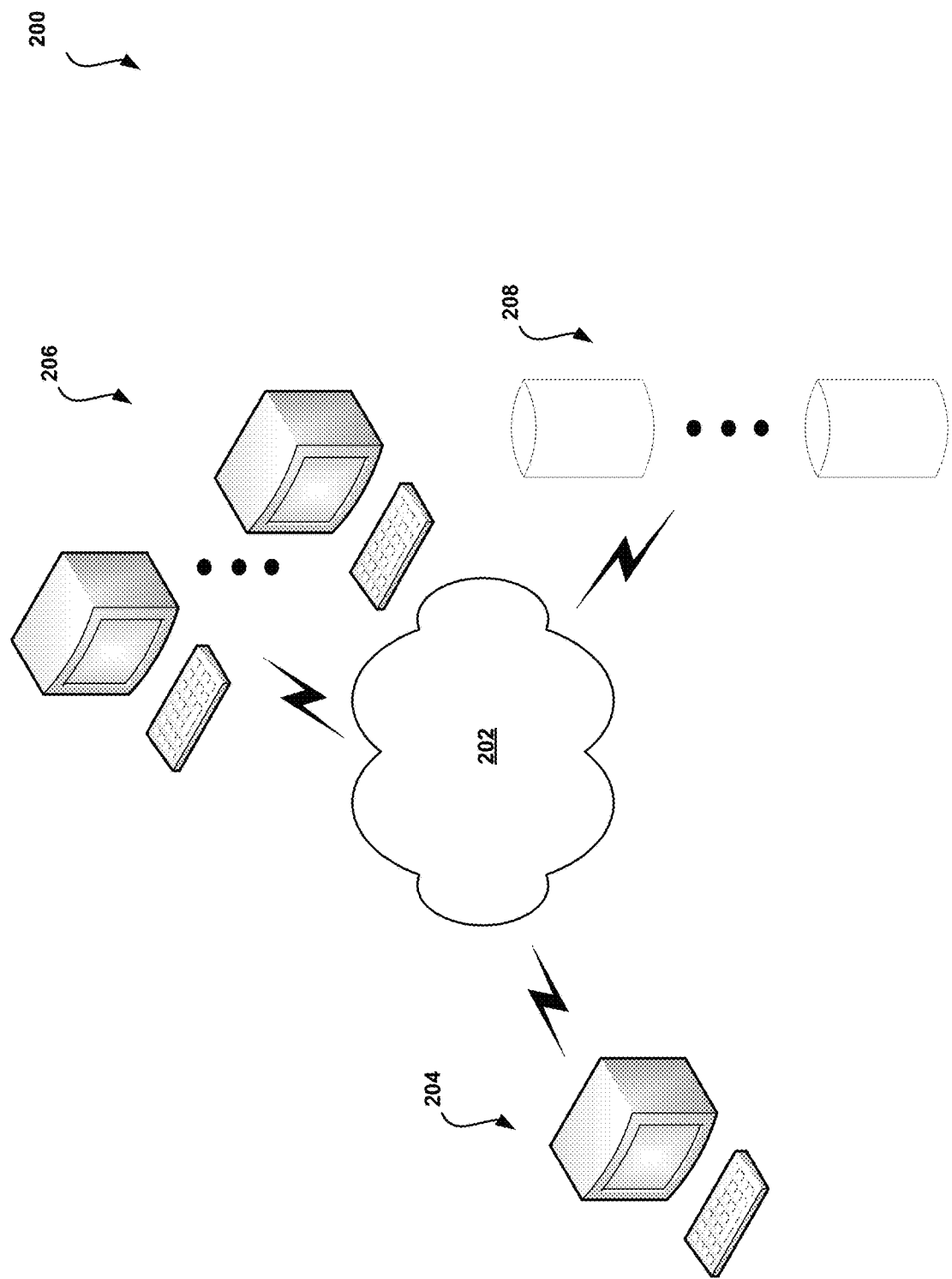
FIG. 2 shows a system for error handling in multi-layered integrated software applications, in accordance with one embodiment.

FIG. 2 shows a system 200 for error handling in multi-layered integrated software applications, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems/devices 206, either directly or over one or more networks 202, for monitoring such systems/devices 206 and performing error handling in multi-layered integrated software applications. The system 204 may also be in communication with one or more repositories/databases 208.

The system 204 may be utilized to capture and identify actual sources of problems, and thus improve production and management of enterprise applications by reducing cost of analysis and turnaround time of unhandled integration related errors in a system.

The system 204 provides automated error detection and resolution in highly integrated software systems. Herein, an integrated software system may be understood as collection of various layers (e.g., L1, L2 . . . Ln) of applications, which are integrated into one software package. The system 204 improves production of enterprise applications by reducing the cost of analysis and the turnaround time needed for identifying unhandled integration related errors in the software system. The automated error detection method implemented by the system 204 captures and identifies the actual source of problems by analyzing exception trace of error based on predefined configuration and by scanning through logs of each intermediate layer. Hence, the system 204 improves the overall turnaround time and saves the cost of investigation by each intermediate layer.

Figure 3:
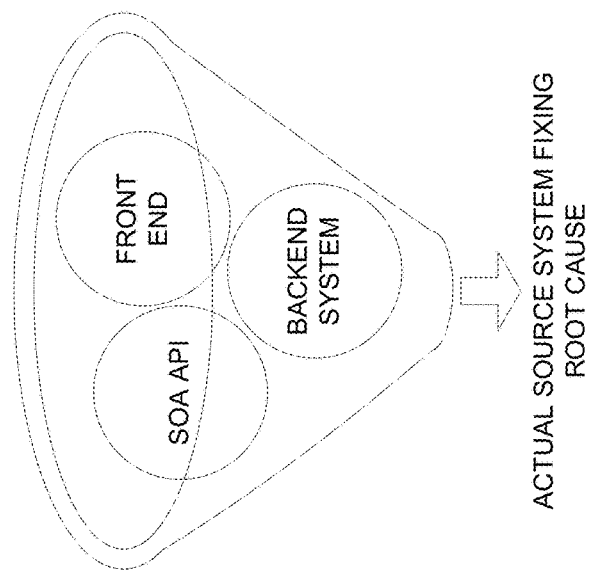
FIG. 3 shows a diagram illustrating a level of an application on which error detection and correction may be performed, in accordance with one embodiment.

FIG. 3 shows a diagram 300 illustrating a level of an application on which error detection and correction may be performed, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

As shown in FIG. 3, the error detection and correction method implemented by the system described herein may be implemented at a top most application layer (i.e. the front end of the enterprise product portfolio) in order to avoid duplication of errors being reported by the automation process.

In one embodiment, the system for automated software error detection and correction in the integrated software systems may include a GUI component that provides the ability to manually feed an exception for analysis to identify the source of problems. The GUI component can be used by the service desk analysts to analyze incidents reported by end users, and thus increases the ability of the service desk analyst to analyze such issues without having required technical skills.

Figure 4:
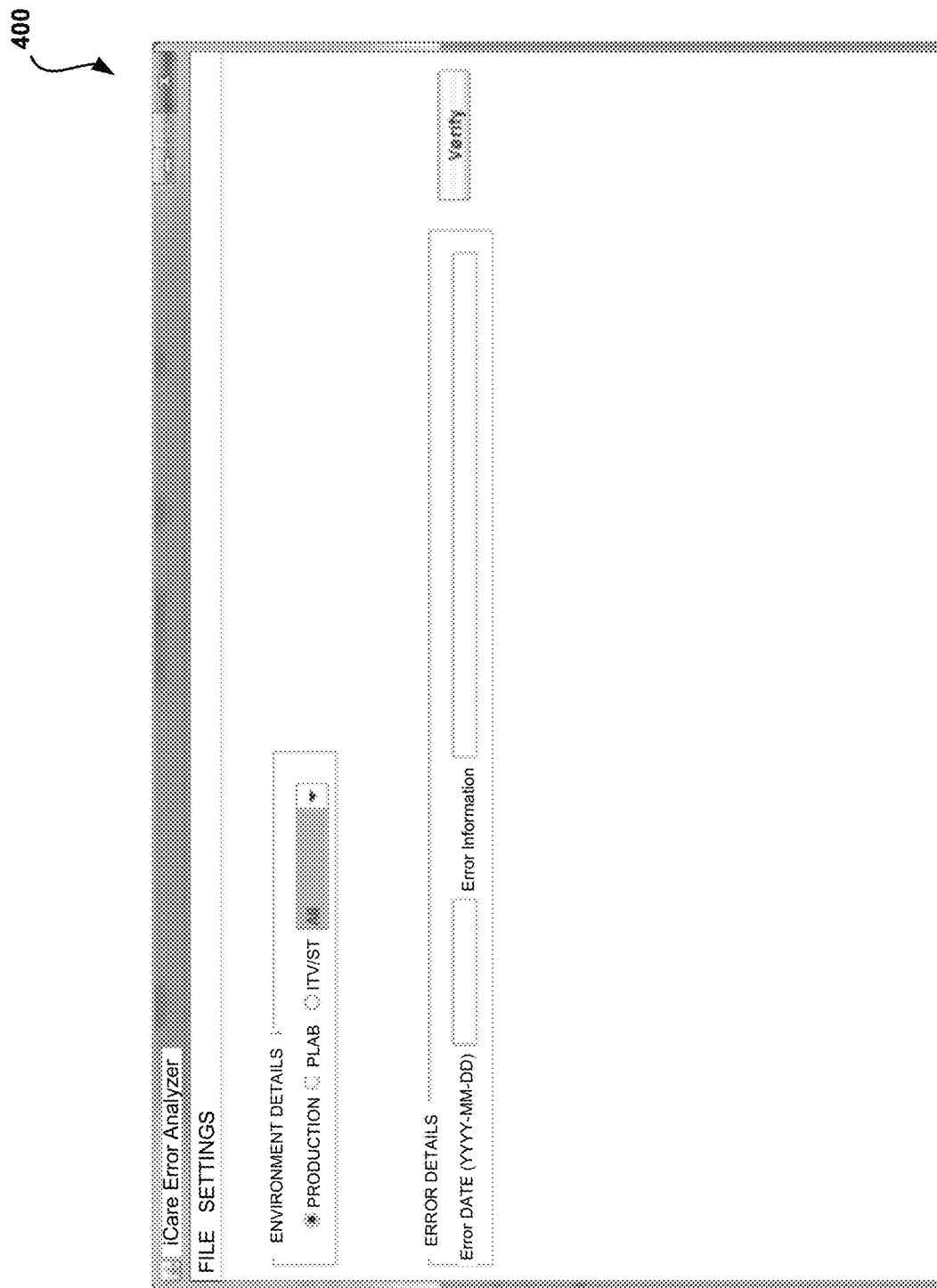
FIG. 4 shows a user interface illustrating a simplified representation of a GUI component that may be provided in a system for automated software error detection and correction, in accordance with one embodiment.

FIG. 4 shows a user interface 400 illustrating a simplified representation of a GUI component that may be provided in a system for automated software error detection and correction, in accordance with one embodiment. As an option, the user interface 400 may be implemented in the context of the details of the previous figures and/or any subsequent figure(s). Of course, however, the user interface 400 may be implemented in the context of any desired environment. Further, the aforementioned definitions may equally apply to the description below.

As shown in FIG. 4, the GUI component provides the option of selecting an environment, so the service desk analyst can select the environment in which the application is running and facing issues, such as production, PLAB, etc. In one embodiment, a service desk analyst may enter the information related to the error in the error details section provided in the GUI. The error information may be provided by the end user to service desk analysts.

Figure 5:
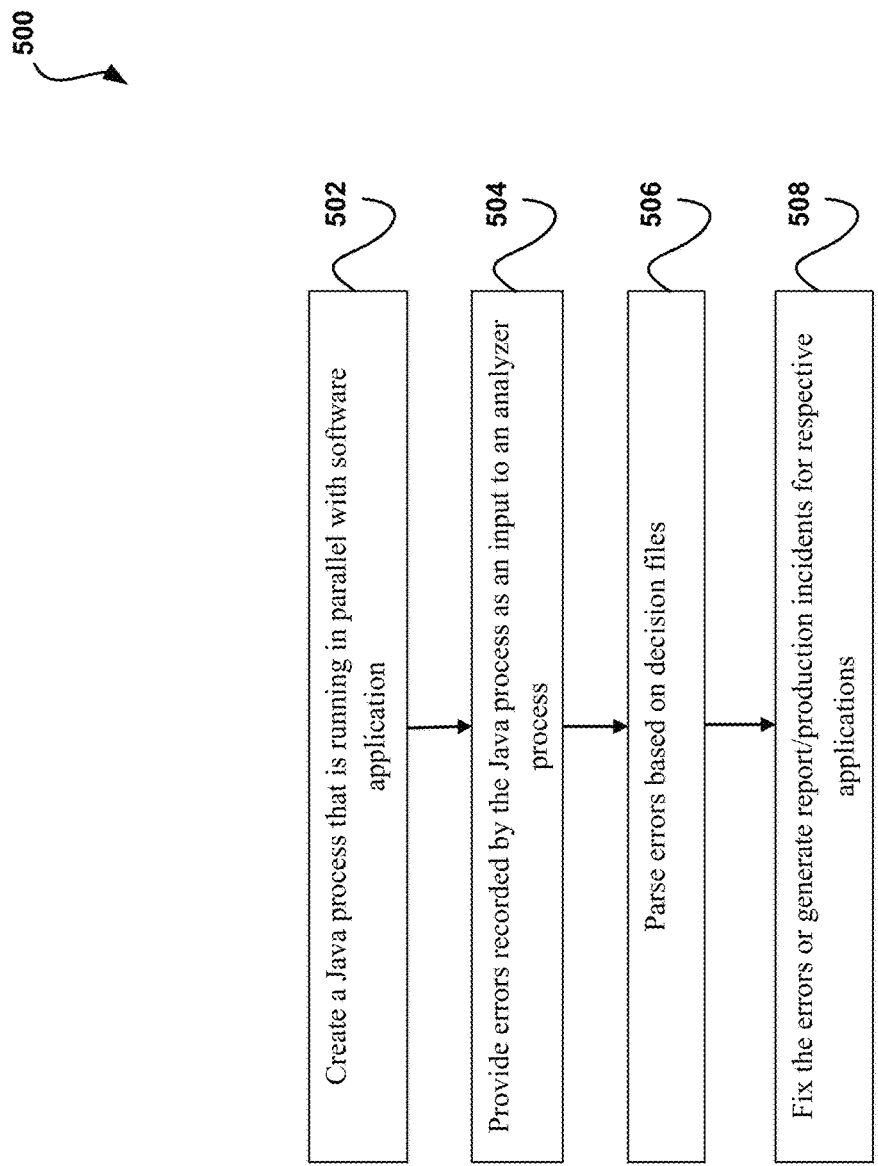
FIG. 5 shows a flow diagram illustrating a simplified broad level flow diagram for error/exception detection and correction in a highly integrated application, in accordance with one embodiment.

FIG. 5 shows a flow diagram 500 illustrating a simplified broad level flow diagram for error/exception detection and correction in a highly integrated application, in accordance with one embodiment. As an option, the diagram 500 may be implemented in the context of the details of the previous figures and/or any subsequent figure(s). Of course, however, the diagram 500 may be implemented in the context of any desired environment. Further, the aforementioned definitions may equally apply to the description below.

As shown, a Java process is created that always runs in parallel with the software application to read the logs generated by the application. See operation 502. The errors captured by the Java process are provided as input to an error analyzer process. See operation 504. The input to error analyzer process includes error stack trace and date of errors.

The error analyzer process parses all the errors found in the application based on decision files, where the decision files are the files that include specific keywords that are defined as part of rule configuration that helps to identify the actual source of error. See operation 506. The keywords are mainly based on application design framework (i.e. names in java classes to identify if error is local or at next application layer). The keywords may also include various error messages generated by the application which helps to take right decision.

Once the source application in which the error has occurred is found, the decision files may be utilized to help fix the error automatically or generate report/production incidents for respective applications. See operation 508.

Figure 6:
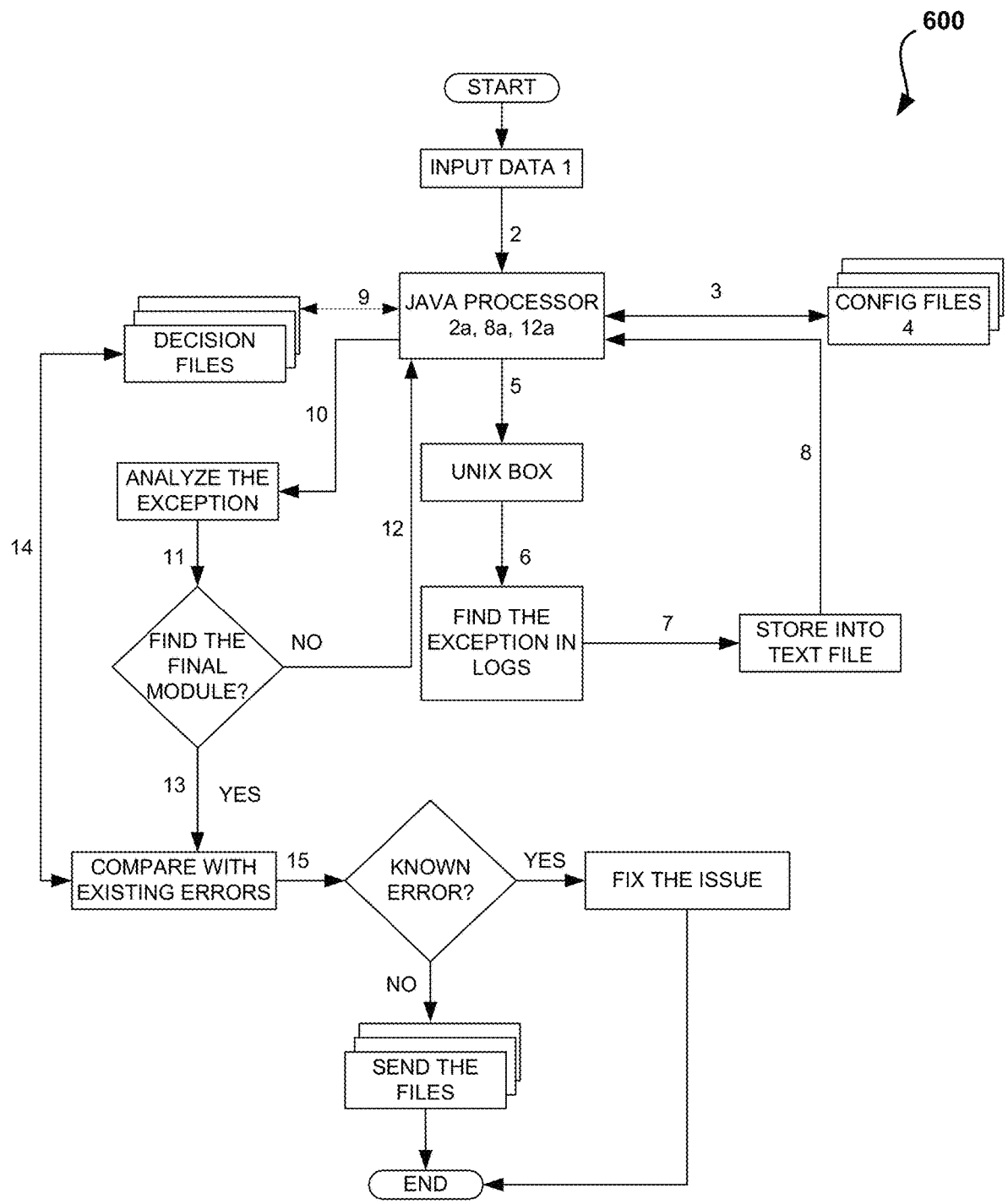
FIG. 6 shows a flow diagram illustrating a method for error/exception detection and correction in a highly integrated application, in accordance with one embodiment.

FIG. 6 shows a flow diagram 600 illustrating a method for error/exception detection and correction in a highly integrated application, in accordance with one embodiment. As an option, the diagram 600 may be implemented in the context of the details of the previous figures and/or any subsequent figure(s). Of course, however, the diagram 600 may be implemented in the context of any desired environment. Further, the aforementioned definitions may equally apply to the description below.

In operation, information such as environment details, error date and error information are provided as an input to a Java processor. See step 1. The information about the errors is either collected from the GUI component or is gathered by the java process running in parallel with the application.

The Java processor takes the input and verifies the input with a configuration file provided in the system. See step 2. The configuration files contain environment details such as application ID, host details including log file location and file formats for all layers.

Next, the Java process reads the data provided in the configuration file. See step 3.

The environment and connection details and the log file name and the location information are extracted from the configuration files, and the connection strings and search commands are then prepared. See step 4.

The Java processor then tries to connect with the respective environment with corresponding details. See step 5. The processor will try to find the exception from the logs by running the prepared search commands. See step 6.

The errors/exceptions found in the logs are stored in a text file. See step 7. The text file in which the errors are stored is sent back to the Java processor. See step 8. The Java processor reads the decision files and loads the files in to the analyzer process. See step 9.

The analyzer process will analyze the exceptions stored in the files based on the decision files. See step 10. The analyzer process will check whether errors/exceptions are present in the same application layer or not. See step 11.

The call is moved back again to the java processor if the errors/exceptions are not present in the same application layer. See step 12. In step 12A, the whole process is repeated again until the application layer in which the errors/exceptions are occurring is found.

Once the application layer in which the errors/exceptions are occurring is found, the application is checked for known errors to determine whether errors are the same that have occurred earlier or the new one. See step 13. The known error information is collected from the decision files. See step 14.

The occurring exception is checked with the known errors. If the exception is found to be known (i.e. that exception has occurred previously), then the exception will be fixed based on predefined solutions or else the java process will generate the report for the source application. The error source application with all layers of errors information is provided to the end user. See step 15.

The configuration and decision files used in this process are prepared based on application design and architecture. The configuration files are used to connect to different layers of the application and to retrieve the errors from the application logs. The decision files contain the set of rules that help to analyze the error and identify the source system and contain the information about the known errors and corresponding actions.

Table 1 and Table 2 show pseudo code examples of a set of rules. Table 1 shows a "ParseException: Customer name has special characters," which points to data corruption and can be used as indicator to run a data patch. Table 2 shows "Exception in UpdateCustomerSOAService," which points to SOA as a problematic layer.

TABLE 1

```
<Errors version="1.1">
    <ErrorString>ParseException: Customer name has special characters</ErrorString>
    <NextStep>Step:UpdateCustomerName.Sql</NextStep>
</Errors>
<Step version="1.1">
    <StepName>UpdateCustomerName.Sql</StepName>
    <Execute>/opt/sqls/UpdateCustomerName.Sql</Execute>
</Errors>
```

TABLE 2

```
<Errors version="1.1">
    <ErrorString>UpdateCustomerSOAService</ErrorString>
    <NextStep>Config:SOA</NextStep>
</Errors>
```

The decision files may also contain the ignorable errors information, so those errors will be ignored by the system. Some specific keywords are defined in the decision rules for the rule engine to parse the error stack trace.

Figure 7:
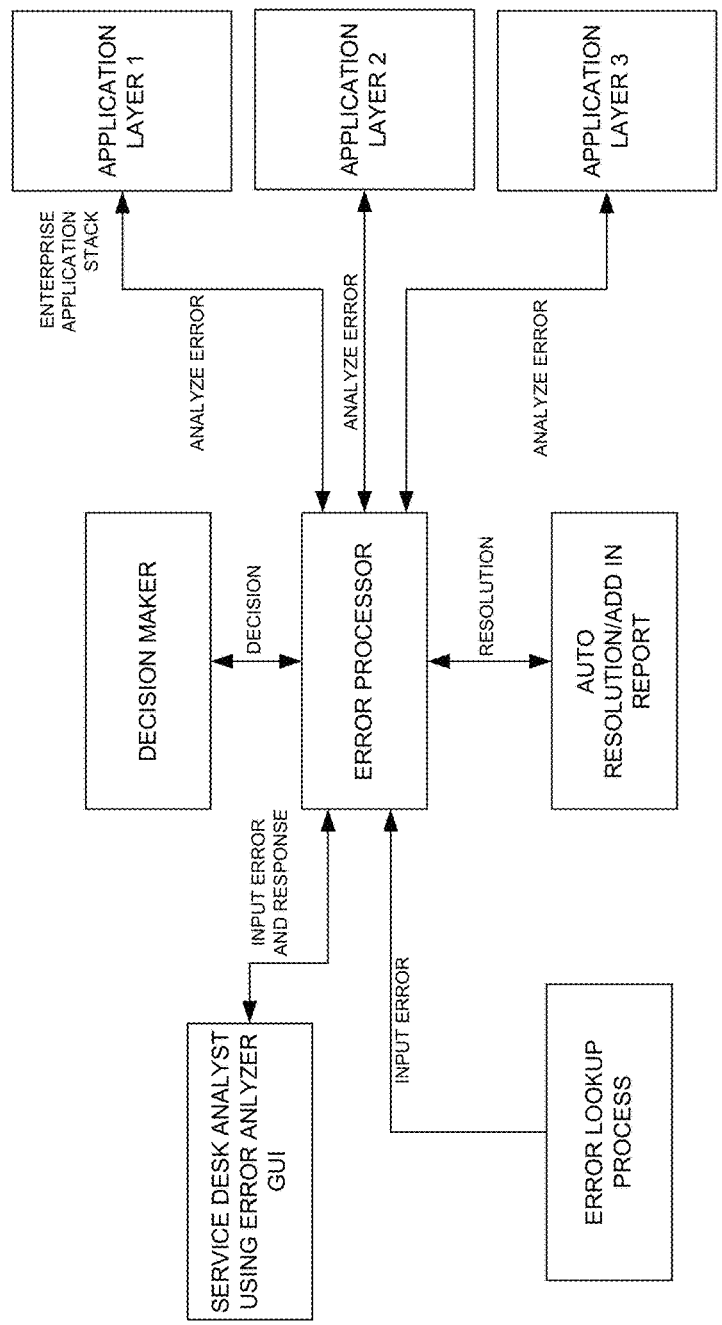
FIG. 7 shows a flow diagram illustrating a use case of a system for error/exception detection and correction in a highly integrated application, in accordance with one embodiment.

FIG. 7 shows a flow diagram 700 illustrating a use case of a system for error/exception detection and correction in a highly integrated application, in accordance with one embodiment. As an option, the diagram 700 may be implemented in the context of the details of the previous figures and/or any subsequent figure(s). Of course, however, the diagram 700 may be implemented in the context of any desired environment. Further, the aforementioned definitions may equally apply to the description below.

As shown in FIG. 7, an enterprise application is shown that has three application layers, application layer 1, application layer 2 and application layer 3. An error/exception can be present at any layer of the application. An error processor is shown that takes input from the service desk analyst using GUI component or from the error look up process that is running in parallel with the enterprise application.

The look up process is the java process and the error processor is the Java processor. The input to the error processor are the errors/exceptions captured by the error look-up process or provided by the end user. A decision maker is provided to help the error processor in finding the exact location of the error (e.g. application layer 1, 2 or 3) in which the error is occurring.

The decision maker helps in identifying whether the error should be further checked in a next layer of application. The error processor, after identifying the exact location of the error, again checks whether the error is a known error or not in the decision maker. If the error is found to be known, then the error may be fixed using an auto resolution process, otherwise the error may be added in the report for the source application. The error processor will provide the error source application with all layers of errors information as a response to a service desk analyst.

Figure 8:
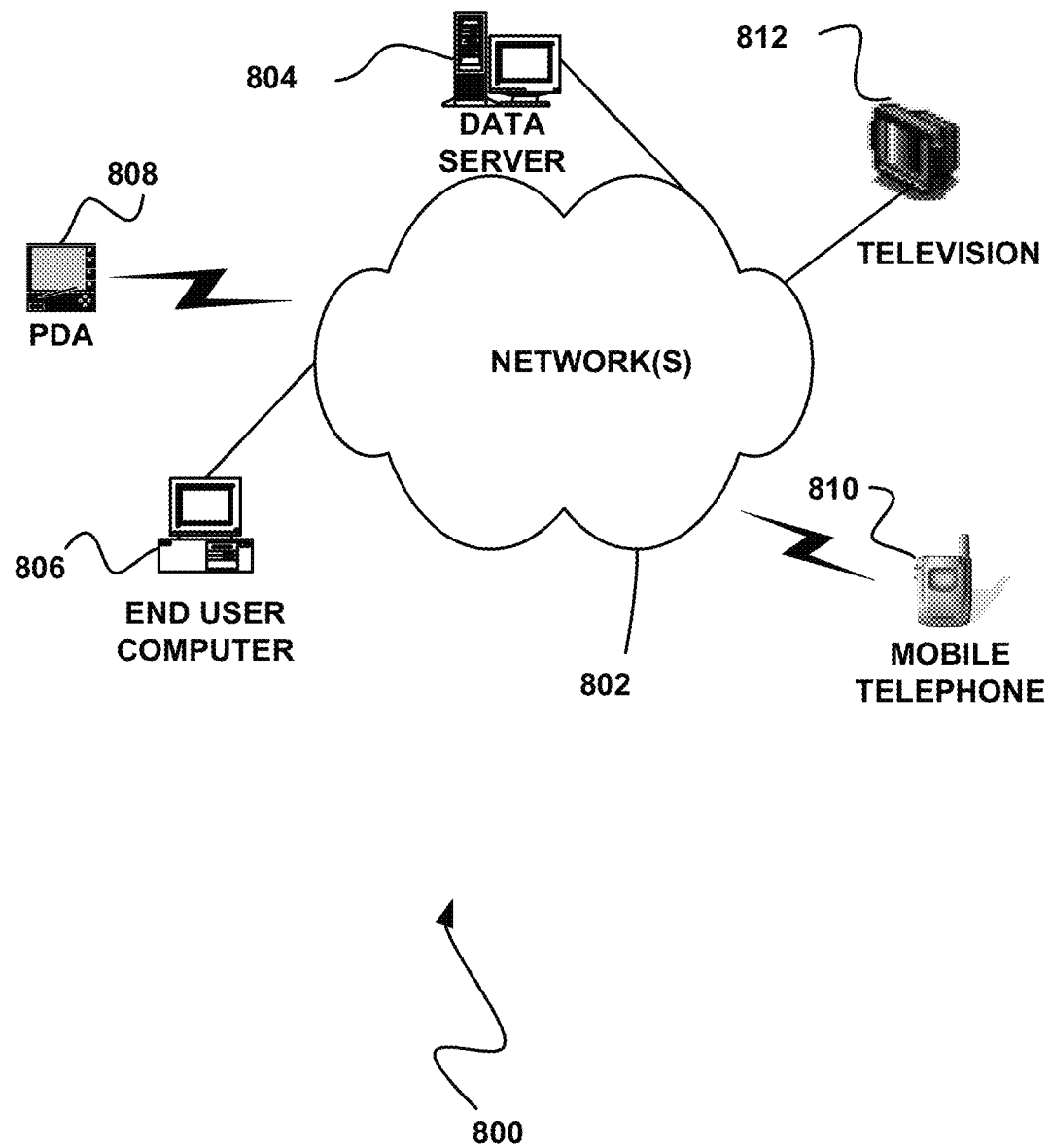
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
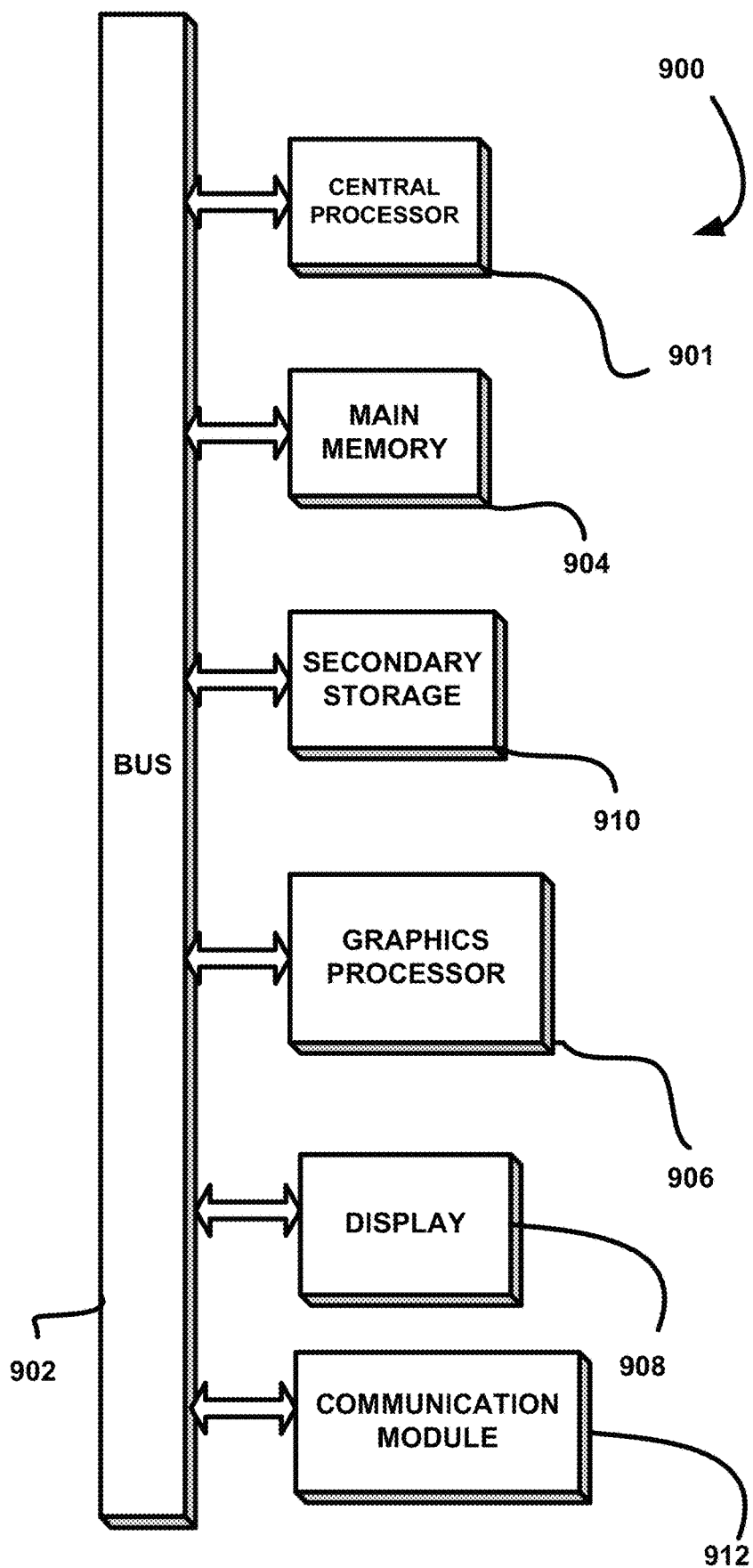
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of non-transitory computer-readable media.

The system 900 may also include one or more communication modules 912.

The communication module 912 may be operable to facilitate communication between the system 900 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    monitoring, by a system, a multi-layered integrated software application utilizing a process that runs in parallel with the multi-layered integrated software application and reads one or more logs generated by the multi-layered integrated software application, wherein the multi-layered integrated software application is a software package that integrates a plurality of layers of applications;
    identifying, by the system, an error from the one or more logs;
    parsing, by the system, the error based on one or more decision files, wherein the one or more decision files include specific keywords that are defined as part of a rule configuration utilized to identify error sources; and
    identifying, by the system, a layer of the plurality of layers that is a source of the error in the multi-layered integrated software application utilizing the one or more decision files.

2. The method of claim 1, further comprising automatically fixing, by the system, the error based on the one or more decision files.

3. The method of claim 1, further comprising automatically generating, by the system, one or more incident reports for the error based on the one or more decision files.

4. The method of claim 1, further comprising determining, by the system, that the error matches a historical or known error.

5. The method of claim 4, further comprising fixing, by the system, the error based on predefined solutions associated with the historical or known error.

6. The method of claim 1, further comprising detecting, by the system, that the error exists in a first layer of the multi-layered integrated software application, and based on the detection, searching a second layer of the multi-layered integrated software application for the error.

7. A computer program product comprising computer executable instructions stored on a non-transitory computer readable medium that when executed by a processor instruct the processor to:
    monitor a multi-layered integrated software application utilizing a process that runs in parallel with the multi-layered integrated software application and reads one or more logs generated by the multi-layered integrated software application, wherein the multi-layered integrated software application is a software package that integrates a plurality of layers of applications;
    identify an error from the one or more logs;
    parse the error based on one or more decision files, wherein the one or more decision files include specific keywords that are defined as part of a rule configuration utilized to identify error sources; and
    identify a layer of the plurality of layers that is a source of the error in the multi-layered integrated software application utilizing the one or more decision files.

8. The computer program product of claim 7, wherein the computer program product is configured to automatically fix the error based on the one or more decision files.

9. The computer program product of claim 7, wherein the computer program product is configured to generate one or more incident reports for the error based on the one or more decision files.

10. The computer program product of claim 7, wherein the computer program product is configured to determine that the error matches a historical or known error.

11. The computer program product of claim 10, wherein the computer program product is configured to fix the error based on predefined solutions associated with the historical or known error.

12. The computer program product of claim 7, wherein the computer program product is configured to detect that the error exists in a first layer of the multi-layered integrated software application, and based on the detection, searching a second layer of the multi-layered integrated software application for the error.

13. A device, comprising:
    a non-transitory memory storing instructions; and
    one or more processors in communication with the non-transitory memory, wherein the one or more processors execute the instructions to:
    monitor a multi-layered integrated software application utilizing a process that runs in parallel with the multi-layered integrated software application and reads one or more logs generated by the multi-layered integrated software application, wherein the multi-layered integrated software application is a software package that integrates a plurality of layers of applications;
    identify an error from the one or more logs;
    parse the error based on one or more decision files, wherein the one or more decision files include specific keywords that are defined as part of a rule configuration utilized to identify error sources; and
    identify a layer of the plurality of layers that is a source of the error in the multi-layered integrated software application utilizing the one or more decision files.

14. The device of claim 13, wherein the one or more processors execute the instructions to automatically fix the error based on the one or more decision files.

15. The device of claim 13, wherein the one or more processors execute the instructions to generate one or more incident reports for the error based on the one or more decision files.

16. The device of claim 13, wherein the one or more processors execute the instructions to determine that the error matches a historical or known error.

17. The device of claim 16, wherein the one or more processors execute the instructions to fix the error based on predefined solutions associated with the historical or known error.

18. The method of claim 1, wherein the one or more logs includes a plurality of logs of the plurality of layers of applications.

\* \* \* \* \*